(12) United States Patent
Yamaguchi et al.

(10) Patent No.: US 6,510,113 B1
(45) Date of Patent: Jan. 21, 2003

(54) RECORDING APPARATUS, RECORDING METHOD, AND RECORDING MEDIUM CARRYING COMPUTER PROGRAM FOR RECORDING A SIGNAL

(75) Inventors: Akihisa Yamaguchi, Tokorozawa (JP); Masaaki Matsumoto, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 245 days.

(21) Appl. No.: 09/689,776

(22) Filed: Oct. 18, 2000

(30) Foreign Application Priority Data

Dec. 20, 1999 (JP) .......................................... 11-360597

(51) Int. Cl.[7] ................................................ G11B 5/09
(52) U.S. Cl. ................................ 369/47.22; 369/53.23; 369/59.26
(58) Field of Search .......................... 369/47.19, 47.21, 369/47.22, 53.31, 53.2, 59.23, 59.24, 59.25, 59.26, 59.27

(56) References Cited

U.S. PATENT DOCUMENTS 5,528,572 A * 6/1996 Koizumi et al. ......... 369/47.25
5,625,611 A * 4/1997 Yokota et al. ........... 369/53.22
5,781,515 A * 7/1998 Ogata et al. ............. 369/30.15

* cited by examiner

Primary Examiner—Thang V. Tran
(74) Attorney, Agent, or Firm—Sughrue Mion, PLLC

(57) ABSTRACT

A recording apparatus, a recording method, and a recording medium, which allows a search operation based on a second segment information signal representing finely divided segments of a recording signal even in a player which can perform only a searching operation of a first segment information signal representing large segments of the recording signal. When a change of the second segment information signal of a signal to be recorded is detected, the first segment information signal being formed is updated and the first segment information signal is recorded together with an audio signal. That is, the second segment information signal of the signal to be recorded is converted into the first segment information signal and recorded together with the audio signal.

4 Claims, 3 Drawing Sheets

RECORDING APPARATUS, RECORDING METHOD, AND RECORDING MEDIUM CARRYING COMPUTER PROGRAM FOR RECORDING A SIGNAL

BACKGROUND OF THE INVENTION

1. Field of the Invention

The invention relates to a recording apparatus and a method for recording an audio signal and a recording medium on which a computer program for recording a signal is recorded.

2. Description of Related Art

In the case of music software formed on a CD (Compact Disc), an MD (Mini Disc), a DAT (Digital Audio Tape), or the like, subcode information is recorded in addition to an audio signal corresponding to each music piece. The subcode information includes a track number signal indicating the music piece number, an index number signal indicating a music piece measure that is obtained by finely dividing one music piece, and the like.

In a playing apparatus for playing the music software, a CD player for example, the audio signal is read out from the disc and the track number signal is read out from the subcode information, thereby recognizing the music piece number so that a head part of an arbitrary music piece can be reproduced. Furthermore, by reading out the index number signal from the subcode information, the music piece measures existing in one music piece are recognized and the head of an arbitrary music piece measure can be reproduced. This is generally referred to as "index search function". The index number signal is set to "0" for a soundless portion where no music piece is recorded, i.e., an inter-music portion, and is set to "1" when the first measure of the music piece starts. Subsequently, the index number increases by "1", for example, each time the measure of the music piece changes, and the index number signal having such an index number is recorded. The CD player detects a change point of the index number signal in response to an index search request from the user, thereby searching the head portion of an arbitrary music piece measure.

However, the number of CDs having no index number recorded therein has been increased in recent years. In association with such a trend, many CD players are designed that, only a track number search function is installed and an index search function is not installed. A problem occurs, therefore, such that even if the user has the CDs sold in the past or CDs of classic music on which the index numbers are recorded, the measures cannot be searched on a index unit basis.

OBJECTS AND SUMMARY OF THE INVENTION

The invention has been made to solve the problem described above and it is an object of the invention to provide a recording apparatus in which even in a player such that a second segment signal of a signal to be recorded is converted into a first segment signal and recorded together with an audio signal, so that only a search of the first segment signal as a relatively large unit can be performed, it is possible to form a recording medium which can perform a search substantially on a unit basis of the second segment signal as one of the segments divided finely.

To solve the problem, according to a first aspect of the invention, a recording apparatus is configured to record, on a recording medium, a signal to be recorded which includes an audio signal corresponding to a music piece, first segment information corresponding to predetermined units of the audio signal, and second segment information corresponding to fine units obtained by finely dividing each of said predetermined units represented by the first segment information, the apparatus comprising forming means for forming the first segment information; detecting means for detecting a change of the second segment information of the signal to be recorded; control means for controlling so as to update the first segment information which is formed by the forming means when the detecting means detects the change of the second segment information; and recording means for recording the first segment information which is formed by the forming means together with the audio signal.

When the change of the second segment signal of the signal to be recorded is detected, therefore, the formed first segment signal is updated and the first segment signal is recorded together with the audio signal. That is, the second segment signal of the signal to be recorded is converted into the first segment signal and recorded together with the audio signal. Even in the player which can perform only the search of the first segment signal as a relatively large unit, consequently, it is possible to perform a search substantially on a unit basis of the second segment signal as a finely divided segment.

According to the second aspect of the invention, a recording apparatus is configured to record, on a recording medium, a signal to be recorded in which includes an audio signal corresponding to a music piece, a track number corresponding to the music piece, and an index number corresponding to each portion obtained by finely dividing the music piece, the recording apparatus comprising forming means for forming the track number; detecting means for detecting a change of the index number of the signal to be recorded; control means for performing a control operation to update the track number which is formed by the track number forming means when the change of the index number is detected by the detecting means; and recording means for recording the track number which is formed by the forming means together with the audio signal.

When the change of the index number of the signal to be recorded is detected, therefore, the formed track number is updated and the track number is recorded together with the audio signal. That is, the index number of the signal to be recorded is converted into the track number and recorded together with the audio signal. Consequently, even in the player which can perform the track search only, it is possible to perform a search operation substantially on an index number basis. Therefore, it is possible to form a CD with which a searching operation can be performed on the index number basis in the general CD player.

According to the third aspect of the invention, a recording method is configured to record a signal to be recorded which includes an audio signal corresponding to a music piece, a track number corresponding to the music piece, and an index number corresponding to each portion obtained by finely dividing the music piece, the method comprising: a detecting step of detecting a change of the index number of the signal to be recorded; a forming step of updating the track number which is formed when the change of the index number is detected; and a recording step of recording the track number formed in the forming step together with the audio signal.

When the change of the index number of the signal to be recorded is detected, therefore, the track number being formed is updated and the track number is recorded together with the audio signal. That is, the index number of the signal to be recorded is converted into the track number and recorded together with the audio signal. Even in the player which can perform only the track search, consequently, it is possible to perform a search substantially on an index unit basis. In the general CD player, therefore, it is possible to form a CD with which a search operation can be performed on an index number basis.

According to the fourth aspect of the invention, a recording medium has a computer program recorded thereon for recording a signal to be recorded which includes an audio signal corresponding to a music piece, a track number corresponding to the music piece, and an index number corresponding to each portion obtained by finely dividing the music piece, wherein the computer program functions to control recording means to update a track number being formed when a change of the index number of the signal to be recorded is detected and to record the formed track number together with the audio signal.

When the change of the index number of the signal to be recorded is detected, therefore, the formed track number is updated and the track number is recorded together with the audio signal. That is, the index number of the signal to be recorded is converted into the track number and recorded together with the audio signal. Even in the player which can perform only the track search, consequently, it is possible to perform a search substantially on an index unit basis. In the general CD player, therefore, it is possible to form a CD with which a search operation can be performed on an index number basis.

DETAILED DESCRIPTION OF THE PREFERRED EMBODIMENT

An embodiment of the invention will be described in detail hereinbelow with reference to the drawings.

Figure 1:
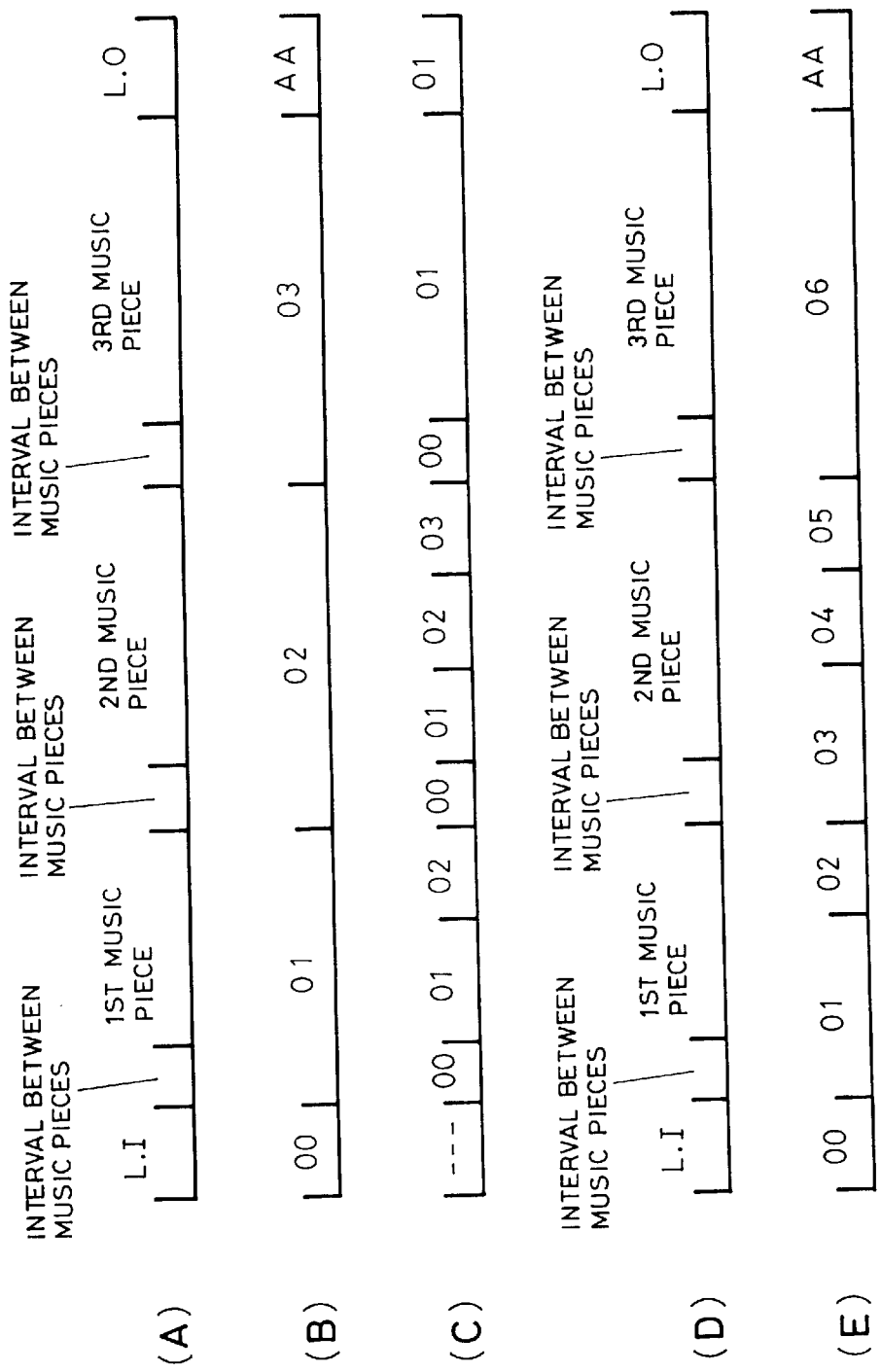
FIG. 1 is a conceptual diagram of a CD format.

FIG. 1 shows a conceptual diagram of a CD format. As shown here, track numbers (B) are allocated in correspondence to a plurality of music pieces (A) which are recorded in a CD. Reference characters L.I and L.O in each of the music pieces (A) denote a lead-in area and a lead-out area. An index number (C) is allocated in correspondence to, for example, each movement in each music piece. "00" of the index number (C) corresponds to an interval between the music pieces. The index numbers "01", "02", "03", . . . are sequentially allocated from substantially the head of music piece information. In the invention, when the music piece information in the CD (transferring source) in which the index numbers have been recorded is transferred to a recordable CD media (transfer destination) such as CD-R (CD-Recordable), CD-RW (CD-ReWritable), or the like, by converting a subcode from the index number into the track number and recording it, a recorded CD-R or CD-RW which makes it possible to search substantially on an index unit basis even in the ordinary CD player is formed. That is, by converting the index number (C) on the transferring source side into a conversion track number (E), it is recorded into the subcode of the CD-R on the transfer destination side.

Figure 2:
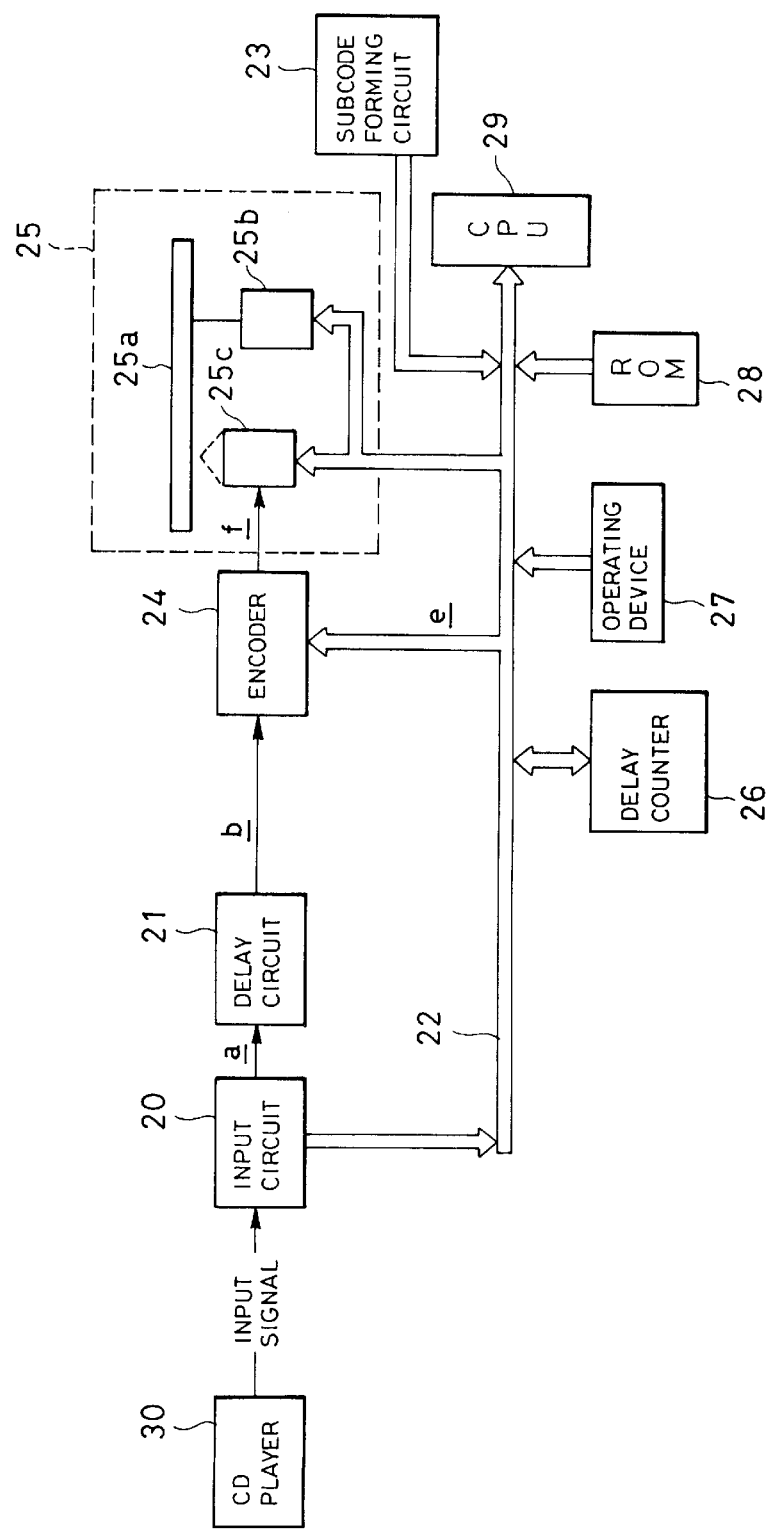
FIG. 2 is a diagram showing a construction of a recording apparatus according to the invention.

FIG. 2 shows a construction of an audio signal recording apparatus according to the invention. In FIG. 2, a source on the transferring source side, namely, a digital signal generated from a CD player 30 here is supplied as an input signal to an input circuit 20. The digital signal is a signal read out from the CD enclosed in the CD player 30. The digital signal includes an audio signal serving as music piece information and a subcode signal. The input circuit 20 extracts an audio signal (a) corresponding to each music piece from the supplied digital signal and supplies it to a delay circuit 21 constructed by a memory or the like. The input circuit 20 further extracts the subcode signal from the supplied digital signal and generates it as a read subcode signal onto a CPU bus 22. The audio signal (a) is supplied to the delay circuit 21. The audio signal (a) is delayed by a predetermined time, for example 3 seconds by the delay circuit 21 and, thereafter, it is sent to an encoder 24.

The encoder 24 sets a delay audio signal (b) as a main code signal, combines it with a formation subcode signal (e) supplied from the CPU bus 22, obtains a CD formatted signal, and supplies a modulation signal (f) obtained by modulating the CD formatted signal to a recording unit 25. Subcode forming means 23 forms the formation subcode signal (e) in response to a command from a CPU (Central Processing Unit) 29, which will be explained later, and supplies it to the CPU bus 22. The recording unit 25 is constructed by: a CD-R 25a as a recording medium for recording; a spindle motor 25b for rotating the CD-R 25a; and an optical head 25c for converting the modulation signal (f) into a laser beam and irradiating it onto the CD-R 25a. The modulation signal (f) is recorded to the CD-R 25a by the laser beam irradiated from the optical head 25c. Operating device 27 sends an operation request signal according to an operating instruction from the user to the CPU bus 22. For example, the operating device 27 sends a recording operation request signal to the CPU bus 22 in response to a recording operating instruction from the user or sends a subcode conversion recording mode request signal to the CPU 22 in response to a subcode conversion recording mode information, which will be explained later. The CPU 29 executes various operation controls of the recording apparatus with the above construction through the CPU bus 22 in accordance with an operation procedure stored in an ROM (Read Only Memory) 28.

Figure 3:
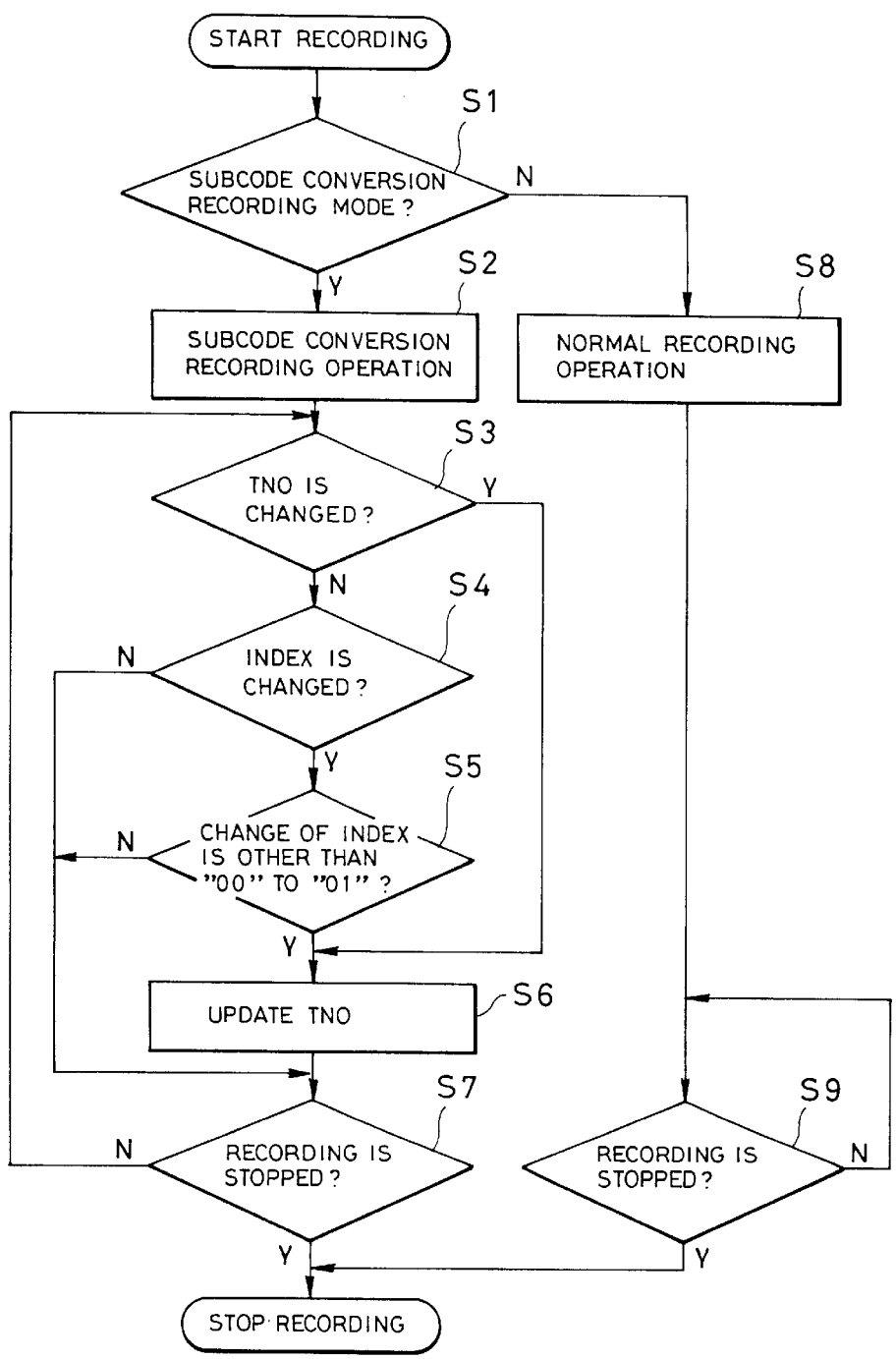
FIG. 3 is a flowchart for the recording operation by the recording apparatus of the invention.

The recording operation by the audio signal recording apparatus of the invention will now be described hereinbelow with reference to FIGS. 2 and 3. When the recording operating instruction is issued by the user via the operating device 27, the recording operation request signal is sent to the CPU bus 22. The CPU 29 discriminates whether the subcode conversion recording mode request signal has been issued in response to the recording operation request signal or not (step 1). A subcode conversion recording mode is a mode in which the user converts an index number in the CD which is reproduced by the CD player 30 as a transferring source into a track number in case of a CD-R on the transfer destination side which is recorded by the recording unit 25 and records it. The user designates the subcode conversion recording mode by using the operating device 27 before the recording instruction or simultaneously therewith.

When the generation of the subcode conversion recording mode request signal is detected in step 1, the apparatus enters a subcode conversion recording mode. In step 2, when the CPU 29 detects the input of the input signal via the CPU bus 22, the apparatus automatically enters a recording mode. In detail, a control signal for setting the recording unit 25 into a recording pause mode is sent to the CPU bus 22. The CPU 29 subsequently reads a read-out subcode signal which is supplied from the input circuit 20 through the CPU bus 22 and discriminates whether the audio signal (a) according to the first music piece to be recorded has been supplied from the source side or not by checking the read-out subcode signal. In this instance, if it is determined that the audio signal (a) has been supplied from the source side, the CPU 29 transmits a recording start command signal to the recording unit 25 via the CPU bus 22 (step 2). The recording unit 25 resets the recording pause mode and starts the recording operation by the recording start command. When the recording is started, the subcode forming means 23 supplies the track number "01" to the encoder 24 via the CPU bus 22.

During the recording, the CPU 29 discriminates whether the track number in the subcode of the input signal has been changed or not (step 3). When the track number changes, step 6 follows and the CPU 29 controls the subcode forming means 23 so as to form the track number obtained by increasing the value of the current track number by "01". When the track number does not change, step 4 follows. In step 4, whether the index number has been changed or not is discriminated (step 4). If it is detected in step 4 that the index number has been changed, whether the contents of the change indicate a change other than a change of the index number from "00" to "01" or not is discriminated (step 5). This is because the index number "00" indicates an interval between music pieces and if the track number is updated when the position is shifted from the interval between the music pieces to the actual music piece information, one track number is allocated only to the interval between the music pieces on the CD-R 25a after the recording. Therefore, step 5 is provided to prevent this problem.

If it is determined in step 5 that the change indicates the change other than the change of the index number from "00" to "01", the track number is updated in step 6. In step 6, the CPU 29 instructs the subcode forming means 23 so as to increase the track number by "01" as mentioned above. If the change of the index number is not detected in step 4 or if the change indicates the change of the index number from "00" to "01" in step 5, step 7 follows and whether a recording stop command has been issued or not is discriminated (step 7). If the recording stop command is issued, the CPU 29 controls the recording unit 25 so as to stop the recording. When the recording stop command is not issued, step 3 follows and the recording operation is continued.

When the recording in the subcode conversion recording mode is performed, information as shown in (D) or (E) in FIG. 1 is recorded on the CD-R 25a. According to the CD-R 25a, even in the CD player having only the track number search function, the search can be performed substantially on an index unit basis.

When the user desires a normal recording mode and issues only the recording operating instruction, since the subcode conversion recording mode signal is not detected in step 1, the CPU 29 controls so as to perform the normal recording operation. The normal recording operation is an operation such that the recording contents in the CD enclosed in the CD player 30 are recorded as they are to the CD-R 25a. That is, the conversion from the index number into the track number as in case of the subcode conversion recording mode is not performed. When the user does not desire the index search or when he desires a CD-R having the same contents as those of the CD as a source, therefore, the normal recording mode can be selected.

As will be also understood from FIG. 1, according to the CD format, when the track number changes, the index number also changes simultaneously. In the case where, however, the subcode recording precision in the CD of the source is not high and the signal has been recorded in such a manner that the index number changes first in the CD of the source, and the change of the track number which ought to inherently appear simultaneously is performed with a delay time after that, or the like, in the flowchart of FIG. 3, a case where the track number is updated twice is also presumed as results of discrimination in steps 5 and 3. As a countermeasure against this case, there is a method where the discrimination contents in step 5 are set to [the change of the index number is a change other than from "00" to "01" or from "XX (arbitrary value)" to "00"]. That is, also in the case where the index number changes from an arbitrary value to "00", the track number on the CD-R 25a to be recorded is excluded from the target to be updated, thereby avoiding the above problem. Even if the change to "00" is excluded from the updating target of the track number, by detecting the track number change in step 3, the track number on the CD-R 25a as a side to be recorded is updated.

The embodiment has been described above with respect to the audio signal recording apparatus constructed by hardware. The invention, however, is not limited to it. Functions similar to those of the audio signal recording apparatus of the hardware can be also realized by a method whereby a part of the construction in FIG. 2 or the control shown in FIG. 3 is constructed by a computer program and the computer program is executed by electronic equipment (for example, personal computer or the like) having a microprocessor therein.

For example, a personal computer having a monitor and a CD-ROM drive connected thereto are prepared. In addition to them, a CD-ROM disc as a recording medium on which a computer program which operates on the OS of the personal computer and can record information to the CD-R by controlling the CD-R drive which can also perform the control shown in FIG. 3 has been recorded is also prepared. The computer program recorded on the CD-ROM disc is installed into the personal computer and the computer program is set up so that it can be operated on the personal computer. After that, the CD-R to be recorded is set into the CD-R drive and is allowed to perform a control similar to that in the embodiment. The invention is not limited to the construction in which the CD player 30 as a source is directly connected to the personal computer but can also use a construction such that the recording contents of the CD as a transferring source are preliminarily stored into a storage device such as hard disk or the like in the personal computer by using the CD-R drive and the recording contents are read out from the storage device and recorded to the CD-R as a transferring source.

In this example, although the computer program has been installed into the personal computer through the CD-ROM, it is also possible to construct the apparatus in such a manner that the personal computer is connected to a network (including a wired or wireless network such as telephone line, LAN, or the like) such as Internet or the like and a similar computer program is transmitted (downloaded) through the network into another equipment (for example, computer server) connected to the network and set up into the personal computer.

By recording the computer program onto the recording medium such as a CD-ROM or the like and executing it, functions similar to those of the embodiment can be accomplished.

Although the embodiment has been described by using the CD-R 25a as a target to be recorded, the invention can be also applied to an apparatus for recording another recording medium such as a CD-RW or the like.

In the recording apparatus according to the invention as described above, when the change of the second segment signal of the signal to be recorded is detected, the first segment signal which is formed is updated and the first segment signal is recorded together with the audio signal. That is, the second segment signal of the signal to be recorded is converted into the first segment signal and recorded together with the audio signal. Even in the player which can perform only the search of the first segment signal as a relatively large unit, consequently, the search can be performed substantially on a unit basis of the second segment signal as a finely divided segment.

For example, therefore, even in the general CD player having no index search function, a CD-R which can perform a search substantially on an index unit basis can be formed.

What is claimed is:

1. A recording apparatus for recording, on a recording medium, a signal to be recorded which includes an audio signal corresponding to a music piece, first segment information corresponding to predetermined units of said audio signal, and second segment information corresponding to each portion obtained by finely dividing each of said predetermined units represented by said first segment information onto a recording medium, said apparatus comprising:

a forming device which forms said first segment information;

a detector which detects a change of said second segment information of said signal to be recorded;

a controller which performs a control operation to update the first segment information which is formed by said forming device when said detector detects the change of said second segment information; and a recording device for recording the first segment information which is formed by said forming device together with said audio signal.

2. A recording apparatus for recording, on a recording medium, a signal to be recorded which includes an audio signal corresponding to a music piece, a track number corresponding to said music piece, and an index number corresponding to each portion obtained by finely dividing said music piece, said apparatus comprising:

a forming device which forms the track number;

a detector which detects a change of said index number of said signal to be recorded;

a controller which performs a control operation to update the track number being formed by said forming device when a change of said index number is detected by said detector; and a recording device which records the track number which is formed by said forming device together with said audio signal.

3. A recording medium having a computer program recorded thereon for recording a signal to be recorded which includes an audio signal corresponding to a music piece, a track number corresponding to said music piece, and an index number corresponding to each portion obtained by finely dividing said music piece, wherein said computer program functions to control a recording device to update the track number being formed when the change of said index number of said signal to be recorded is detected and to record the formed track number together with said audio signal.

4. A recording method for recording a signal to be recorded which includes an audio signal corresponding to a music piece, a track number corresponding to said music piece, and an index number corresponding to each portion obtained by finely dividing said music piece, said method comprising:

a detecting step of detecting a change of said index number of said signal to be recorded;

a forming step of updating the track number being formed when a change of said index number is detected; and a recording step of recording the track number formed in said forming step together with said audio signal.

* * * * *